(12) United States Patent
Burka et al.

(10) Patent No.: US 9,405,575 B2
(45) Date of Patent: Aug. 2, 2016

(54) USE OF MULTI-THREAD HARDWARE FOR EFFICIENT SAMPLING

(71) Applicant: Apple Inc., Cupertino, CA (US)

(72) Inventors: Zachary Burka, San Francisco, CA (US); Serge Metral, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 14/021,895

(22) Filed: Sep. 9, 2013

(65) Prior Publication Data

US 2015/0074668 A1 Mar. 12, 2015

(51) Int. Cl.
*G06F 9/46* (2006.01)
*G06F 9/48* (2006.01)
*G06F 9/50* (2006.01)
*G06F 11/30* (2006.01)
*G06F 11/34* (2006.01)

(52) U.S. Cl.
CPC *G06F 9/48* (2013.01); *G06F 9/485* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 11/3003* (2013.01); *G06F 11/3024* (2013.01); *G06F 11/3096* (2013.01); *G06F 11/3466* (2013.01); *G06F 11/3409* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 5,835,705 A * | 11/1998 | Larsen et al. | 714/47.1 |
| 7,548,238 B2 | 6/2009 | Berteig | |
| 8,254,455 B2 | 8/2012 | Wu | |
| 8,462,166 B2 | 6/2013 | Sowerby | |
| 8,769,495 B1 * | 7/2014 | Gupta | 717/124 |
| 2005/0013705 A1 * | 1/2005 | Farkas et al. | 417/393 |
| 2006/0090161 A1 * | 4/2006 | Bodas | G06F 9/5044 718/100 |
| 2007/0294681 A1 | 12/2007 | Tuck | |
| 2007/0300231 A1 * | 12/2007 | Aguilar et al. | 718/104 |
| 2009/0089014 A1 * | 4/2009 | Silyaev et al. | 702/186 |
| 2009/0189896 A1 | 7/2009 | Jiao | |
| 2010/0135418 A1 | 6/2010 | Zhang | |
| 2011/0119672 A1 * | 5/2011 | Ramaraju et al. | 718/102 |
| 2011/0289485 A1 * | 11/2011 | Mejdrich et al. | 717/128 |
| 2012/0249564 A1 * | 10/2012 | Liu et al. | 345/522 |
| 2012/0324248 A1 | 12/2012 | Schluessler | |
| 2013/0106881 A1 | 5/2013 | Hendry | |
| 2013/0113801 A1 | 5/2013 | Monson | |
| 2013/0238938 A1 | 9/2013 | Baliga | |
| 2014/0089699 A1 * | 3/2014 | O'Connor et al. | 713/322 |

(Continued)

*Primary Examiner* — Charles Swift
(74) *Attorney, Agent, or Firm* — Blank Rome LLP

(57) ABSTRACT

This disclosure pertains to systems, methods, and computer readable media for utilizing an unused hardware thread of a multi-core microcontroller of a graphical processing unit (GPU) to gather sampling data of commands being executed by the GPU. The multi-core microcontroller may include two or more hardware threads and may be responsible for managing the scheduling of commands on the GPU. In one embodiment, the firmware code of the multi-core microcontroller which is responsible for running the GPU may run entirely on one hardware thread of the microcontroller, while the second hardware thread is kept in a dormant state. This second hardware thread may be used for gathering sampling data of the commands run on the GPU. The sampling data can be used to assist developers identify bottlenecks and to help them optimize their software programs.

17 Claims, 6 Drawing Sheets

(56) References Cited

U.S. PATENT DOCUMENTS

| | | |
|---|---|---|
| 2014/0118375 A1 | 5/2014 | Abdalla |
| 2014/0137131 A1* | 5/2014 | Dheap et al. ................. 718/104 |
| 2014/0292771 A1 | 10/2014 | Kubisch |
| 2016/0019130 A1* | 1/2016 | Kruglick ............... G06F 9/5044 714/11 |

* cited by examiner

– 1 –

USE OF MULTI-THREAD HARDWARE FOR EFFICIENT SAMPLING

BACKGROUND

This disclosure relates generally to the management and performance of integrated circuits and systems employing such integrated circuits, and in particular to balancing performance between processing elements and performing analysis of graphical applications.

Many devices such as mobile phones include graphical processing systems for presenting graphics on a display. Development of software applications for such devices is often complex and it is not uncommon to use host computer systems during the development of such programs. Such software applications, however, sometimes result in sub-optimal system performance and resource utilization. Developer tools can be used to detect such performance bottlenecks and to identify opportunities for performance optimization in application development.

To detect possible performance issues, often the developer tools execute the developed program on the target platform to determine the run-time performance/behavior of the program code. Many present-day portable device applications are graphics intensive. To accurately test the performance of such applications, it is useful to execute such applications on the device's graphical processing unit and run a measurement operation at the same to obtain data on the performance of the program. Running a measurement operation, however, can change the run-time behavior of the program it is intended to monitor. As a consequence, the "real" run-time performance of the developed programs may not be available to the program developer or development team.

SUMMARY

Techniques are disclosed to non-intrusively monitor, and obtain performance analysis data on the run-time performance of application programs executed on a graphics processing unit (GPU). In one embodiment, a method in accordance with this disclosure may include processing commands received for the GPU by a first hardware thread of a multicore microcontroller of the GPU, and enabling a second hardware thread of the multicore microcontroller to obtain performance analysis data of the GPU while the first hardware thread processes the commands. After the performance analysis data has obtaining the second hardware thread may be disabled from obtaining the performance analysis data while the first hardware thread continues to processes the commands.

In one embodiment, disabling the second hardware thread from obtaining the performance analysis data include instructions by the first hardware thread to the second hardware thread to stop obtaining the performance analysis data and to clean up one or more resources used by the second hardware thread. In one embodiment, disabling the second hardware thread from obtaining the performance analysis data also includes turning the second hardware thread to a dormant state.

In one embodiment, the target platform in which the GPU executes the application programs may be a mobile device such as a mobile telephone, tablet computer system, or a personal media device. Embodiments of these basic ideas may be implemented as systems and programs or modules of computer readable software retained in non-transitory computer storage.

DETAILED DESCRIPTION

This disclosure pertains to systems, methods, and computer readable media for utilizing an unused hardware thread of a multi-core microcontroller of a graphics processing unit (GPU) to gather sampling data of commands being executed by the GPU. The multi-core microcontroller may include two or more hardware threads and may be responsible for managing the scheduling of commands on the GPU. In one embodiment, the firmware code of the multi-core microcontroller which is responsible for managing the GPU may run entirely on one hardware thread of the microcontroller, while the second hardware thread is kept in a dormant state. This second hardware thread may be used for gathering sampling data of the commands run on the GPU. The sampling data can be used to assist developers identify bottlenecks and to help them optimize their software programs. By utilizing the unused hardware thread, this approach ensures that the data sampling operation does not affect the run-time behavior of the program being executed by the GPU thereby providing a method for accurately and efficiently obtaining performance analysis data of an application.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of processing device design having the benefit of this disclosure.

Figure 1:
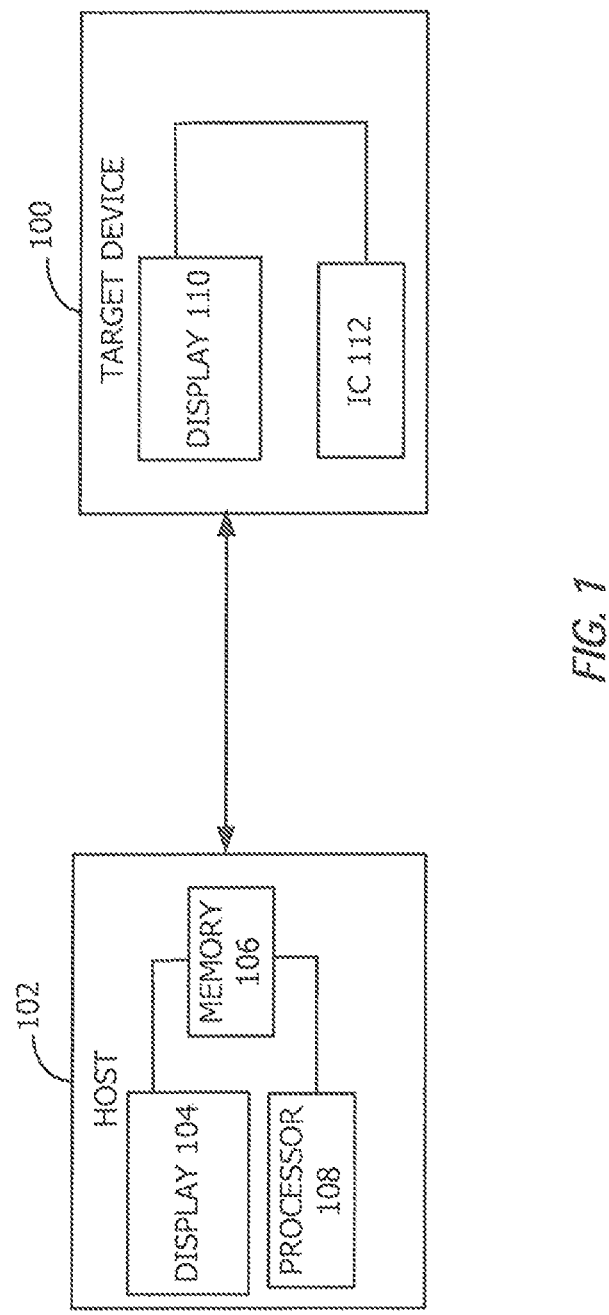
FIG. 1 is a block diagram of various systems for implementing various embodiments of the present invention.

FIG. 1 illustrates a target device 100 coupled to a host system 102. In one embodiment, the host system 102 and the target device 100 may both be any of various computer systems. In some embodiments, the target device 100 may be a portable or mobile device, such as a mobile phone, PDA, audio/video player, and the like. The host system 102 may be configured to act as a host device, which may manage execution of an application (e.g., a graphics application) on the target device 100, e.g., for application development and/or performance analysis.

The host system 102 may include a display component 104 configured to display a graphical user interface (GUI), e.g., of a control or development application being executed on the host system 102. The graphical user interface may include any type of graphical user interface, e.g., depending on the computing platform. The host system 102 may also include at least one memory medium 106 on which one or more computer programs or software may be stored. For example, the memory medium 106 may store a programming development environment application (or developer's tools application) used to create applications for execution by the target device 100. The host system 102 may also include a processor 108 that is configured to execute programs from memory medium 106.

The host system 102 may be coupled to the target device 100 in any of various manners, such as wired or wireless connections over a network. The network can be any type of network such as a local area network (LAN), a wide area network (WAN), the Internet, or an Intranet. In one embodiment, the target device 100 may also act as the host system 102. In such an embodiment, the target device 100 may execute both the target application and the control program.

As shown in FIG. 1, the target device 100 may include a display 110, which may display graphics provided by an application being executed on the target device 100. The application may be any of various applications, such as, for example, games, internet browsing applications, email applications, phone applications, productivity applications, and the like. The application may be stored in a memory of the target device 100. The target device 100 may also include an integrated circuit (IC) 112 which may be a system on a chip (SOC) in one embodiment. An illustrative block diagram of the IC 112 is shown in FIG. 2.

Figure 2:
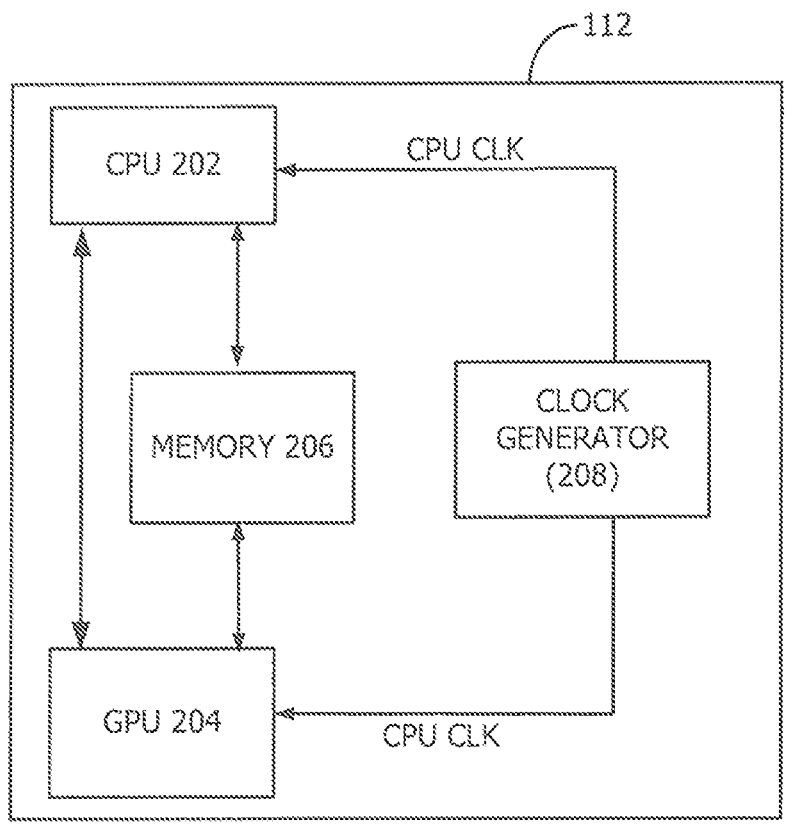
FIG. 2 is a block diagram that illustrates various components of an integrated circuit in accordance with one embodiment.

As shown in FIG. 2, the IC 112 may include various processors such as a central processing unit (CPU) 202 and a GPU 204 which may collectively execute applications running on the target device 100 and which may be coupled together over a system bus. The CPU 202 and the GPU 204 may share a memory 206. In an alternative embodiment, each of the CPU 202 and the GPU 204 may have their own dedicated memory. In still another embodiment, each of the CPU 202 and GPU 204 may utilize some memory dedicated to their own use while also sharing some common memory.

The memory 206 may store one or more programs for implementing embodiments described herein. For example, the memory 206 may store a program for capturing and encoding graphics commands received from an application. The memory 206 may also store a program for playing back a stream of graphics commands which may be provided from the host 102. Further, the memory 206 may store a program for performing sampling or monitoring of the application when it is executing on the target device 100. In other embodiments, the programs may be stored on the host system 102 and may be read onto the target device 100 for execution.

The IC 112 may also include a clock generator 208. The clock generator may supply clocks to the CPU 202 (CPU CLK), the GPU 204 (GPU CLK), and any other circuitry in the IC 112. The clock generator 208 may include any clock generation circuitry (e.g. one or more phase lock loops (PLLs), digital delay lock loops (DLLs), clock dividers, etc.). The clock generator 208 may be programmed to set the desired clock frequencies for the CPU clock, the GPU clock, and other clocks.

Figure 3:
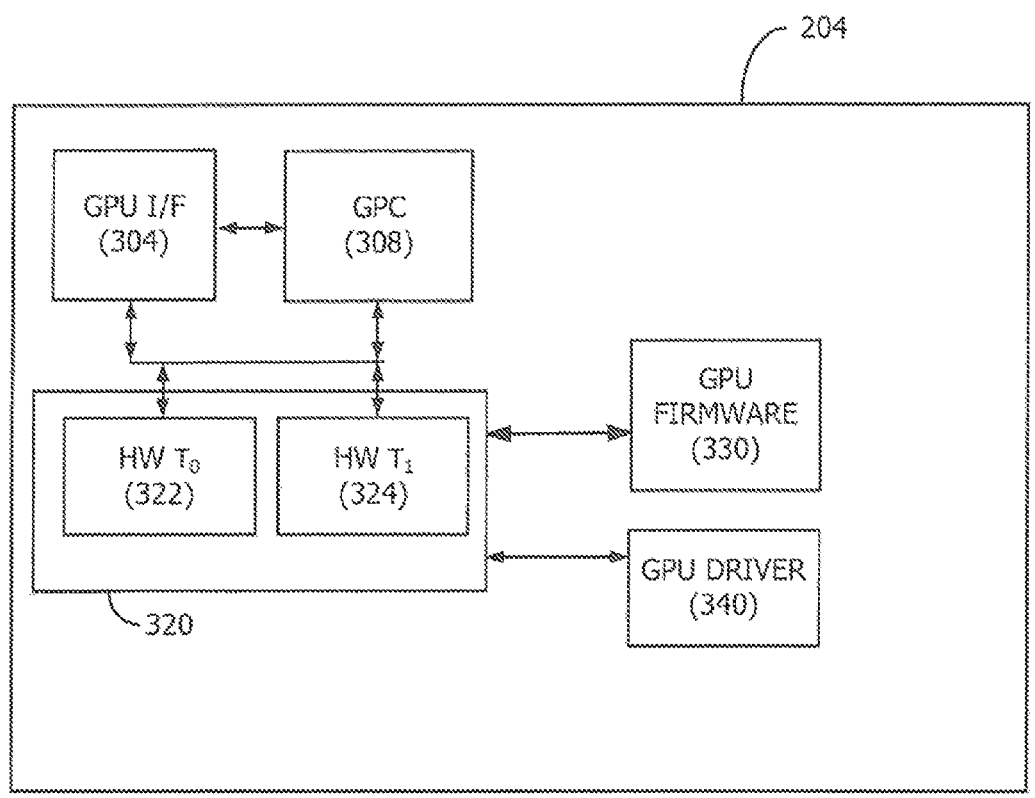
FIG. 3 is a block diagram that illustrates various components of a graphical processing unit of the integrated circuit of FIG. 2 in accordance with one embodiment.

FIG. 3 illustrates a block diagram of the GPU 204, in one embodiment. As shown, the GPU 204 may include a GPU interface 304. The GPU 204 may be a standalone processor or may be one of multiple processors that are implemented as a single integrated circuit such as a system on a chip (SOC). In one embodiment, GPU 204 may be implemented as part of an integrated circuit such as that disclosed in co-pending application Ser. No. 13/466,597, filed on May 8, 2012 and entitled "Graphics Hardware and Mode Controls," which is incorporated herein by reference in its entirety.

The GPU interface 304 may be configured to receive transactions for the GPU 204 and to transmit data such as measurement data from the GPU 204. The transactions may include commands from the CPU 202, such as a command indicating that there are one or more new tasks for the GPU 204 to perform. The CPU 202 can sometimes modify the commands it submits to the CPU 202 based on instructions received from the host system 102. The transactions may also include responses to read requests transmitted by GPU 204, such as read requests to read task descriptors from memory or to retrieve data that is to be operated upon by GPU 204. The read requests, as well as write requests for results generated by GPU 204 may be transmitted to the memory 206 by the GPU interface 304 from which they may be sent to the host 102. In one embodiment, the GPU interface 304 may include a transaction queue to store received transactions.

The GPU 204 may also include a graphics power controller 308, a processor 320, firmware 330, and a GPU driver 340. The firmware 330 may include program code to cause the processor 320 to execute commands received by the GPU interface 304. The firmware 330 may include any type of storage medium, including the storage media described below with respect to FIGS. 5 and 6. Alternatively, the firmware 330 may be stored on the memory 206. The GPU driver 340 may handle calls or commands that are provided by an application during execution by providing the commands to the GPU processor 320 for execution.

In one embodiment, the processor 320 may be a multicore hardware microcontroller that is embedded in the GPU 204. For example, the processor 320 may be a microcontroller with dedicated interfaces to the firmware 330, and the graphics power controller 308. The multicore hardware microcontroller 320 may include two hardware threads $T_0$ 322 and $T_1$ 324. In one embodiment, the hardware threads $T_0$ 322 and $T_1$ 324 may be a duplicate of each other. In other words, they may be separate instances of the same execution unit each operating separately and concurrently without affecting the other. While, they may share some cache, they may also each have their own cache.

In one embodiment, the multicore microcontroller 320 may be configured to control and manage the scheduling and execution of commands for the GPU 204. This may involve receiving commands for the GPU from the CPU 202 (which may have been transmitted from the host 102), scheduling the commands to be run on the firmware 330 of the GPU 204, responding to events from the GPU 204, and communicating GPU command status back to the CPU 202 through the GPU interface 304. The scheduling of commands by the microcontroller processor 320 may involve supplying at least one of the hardware threads tasks and ensuring that the microcontroller processor 320 stays as busy as possible by feeding the processor 320 with new commands as soon as it has completed previous commands.

In one embodiment, the entire task of scheduling commands for execution by the firmware, running the firmware and communication with the GPU interface 304 may be performed by $T_0$ 322 of the two hardware threads of the multi-core microcontroller 320. In normal use, the second hardware thread $T_1$ 324 may be kept in a dormant state. $T_1$ 324 may be powered on and clock gated, but it may not be executing any instructions. This is done, in one embodiment, to conserve energy and minimize the power impact of having two hardware threads in the system, by consolidating memory resources and allowing the main hardware thread ($T_0$ 322) full control and use of the various graphics system's resources (e.g., caches, memory bandwidth, etc.) to process GPU commands as quickly and efficiently as possible.

As the second hardware thread is in a dormant state and essentially not performing any operations, it may be used to obtain performance analysis data of the tasks performed by the GPU when running an application. As the two hardware threads are separate and independent, this can be done without affecting the general performance of the microcontroller 320 or significantly impeding the performance of the GPU 204. Thus, the additional task of running a sampling operation does not affect the run-time behavior of the GPU 204 and the data collected. As a result, the performance analysis data obtained accurately reflects the performance of the program. Moreover, as the second hardware thread ($T_1$ 324) is already powered on and clock gated, obtaining the sampling data does not significantly increase power consumption. Thus, it has been determined that sampling data can be obtained by the second hardware thread efficiently and accurately while maintaining a normal mode of operation for the GPU 204.

The performance analysis data obtained can be helpful when running an application supplied by the host system 102 for testing and performance analysis during program development. Thus, the hardware thread $T_1$ 324 may be used to examine the status of the GPU 204 and inspect the work the GPU is performing as it is executing programs provided by the application. Upon examination, the hardware thread $T_1$ 324 may obtain and transmit performance analysis data and statistics on the operation of the GPU 204 as it is executing the program. The data obtained may include program counter values from various shader clusters inside of the GPU 204 which are executing the programs supplied by the host 102. The counter and address values obtained can give insight as to what instructions from the program the GPU 204 is currently working on, and can be directly correlated back to a line of source code in the program code being inspected. By accumulating as many of these values as quickly as possible, it may be possible to identify which instructions the GPU is spending the most time on (i.e., most "hits"), and infer the relative cost of individual instructions. In one embodiment, the statistics obtained may be used to generate heuristics for the developer as to how much time the GPU 204 is spending on each instruction. In another embodiment, the statistics obtained may be used to generate a heat-map of user supplied programs that shows which instructions took the most time, and which parts of a program's algorithms were the most expensive. Thus, in this manner, developers can determine which instructions are the most expensive, and can use that information for program optimization.

Figure 4:
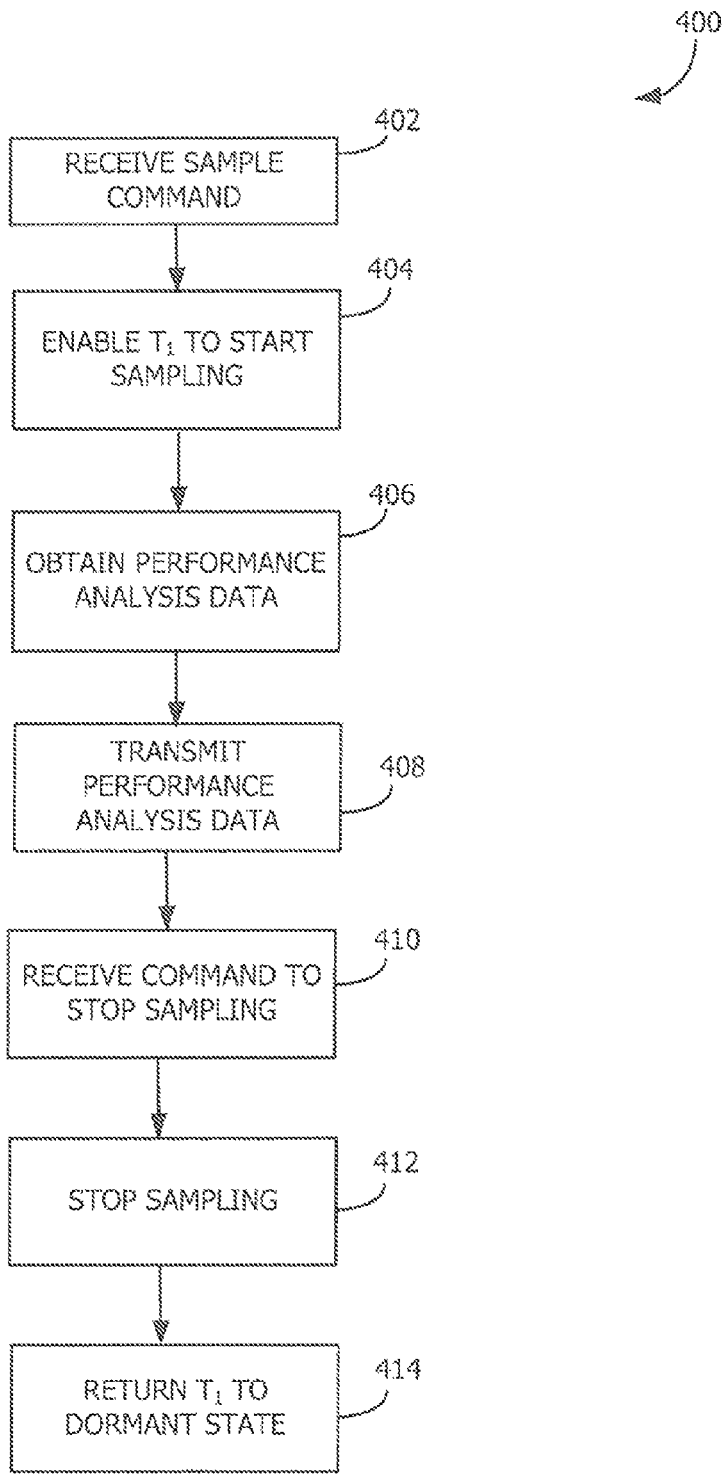
FIG. 4 is flow chart that illustrates an operation for obtaining performance analysis data in accordance with one embodiment.

Referring to FIG. 4, in one embodiment according to this approach, operation 400 for obtaining performance analysis data may begin when hardware thread $T_0$ 322 receives a sampling command (block 402). The sampling command may be transmitted from the host 102 and received by $T_0$ 322 through the GPU interface 304. In one embodiment, the sampling command may be a bit set to a specific state as part of instructions received from the host 102. For example, setting a certain bit to 1 may indicate that sampling should be performed.

After encountering a sampling command, $T_0$ 322 may then enable $T_1$ 324 to start sampling by informing $T_1$ 324 that it needs to start obtaining performance analysis data (block 404) and turning on $T_1$ 324's separate firmware which is solely responsible for obtaining performance analysis data. As $T_1$ 324 uses a separate firmware that is not responsible for facilitating any GPU command processing or execution, the sampling operation may have very little impact on the normal operation of the GPU 204. Executing from separate firmware, $T_1$ 324 may start obtaining performance analysis data (block 406). As the data is obtained, $T_1$ 324 may transmit the obtained data back to the host through the GPU interface 304 (block 408). In one embodiment, obtaining of performance analysis data may be circular with the blocks of data generated being of a constant size. The data may be transmitted to the CPU 202 for transmission to the host 102. Alternatively, the data may be temporarily stored in memory 206 for access by the host 102. In one embodiment, $T_1$ 324 may obtain the sampling data as fast as possible in order to provide the most accurate information to the host 102. The host may receive that data and consume it as fast as possible in order to obtain as much information as possible. In another embodiment, while the data may be obtained by thread $T_1$ 324 as fast as possible, host 102 may obtain it at a slower rate, storing it in memory medium 106 for later analysis by, for example, processor 108.

While the sampling operation is being performed by $T_1$ 324, $T_0$ 322 may continue processing commands as it receives them until it receives a command from the host 102 (or CPU 202) indicating that sampling should be stopped (block 410). In one embodiment, this command may take the form of a change of state in the sampling bit of the instructions being sent from the host 102. For example, if setting the sampling bit to 1 indicates that sampling should be performed, then a change of state to 0 for the sampling bit may indicate that sampling should be stopped. In an alternative embodiment, $T_0$ 322 may stop the sampling operation from running on the second thread when $T_0$ 322 completes its current sampled command on the GPU 204, but without the explicit introduction of a new, non-sampled command from the CPU 202. As $T_0$ 322 is aware of when sampling is enabled and when the currently sampled command is completed, it can disable the sampling thread automatically when the currently sampled command is complete. Upon receiving a command to stop sampling or upon completion of the currently sampled command, $T_0$ 322 may instruct $T_1$ 324 to stop obtaining performance analysis data (block 412), may clean up the resources such as caches, outstanding memory transitions, and the like consumed by $T_1$ 324 during the sampling and may return $T_1$ 324 back to its dormant state (block 414). $T_1$ 324 may then remain in the dormant state until the next command to start sampling is received.

Figure 5:
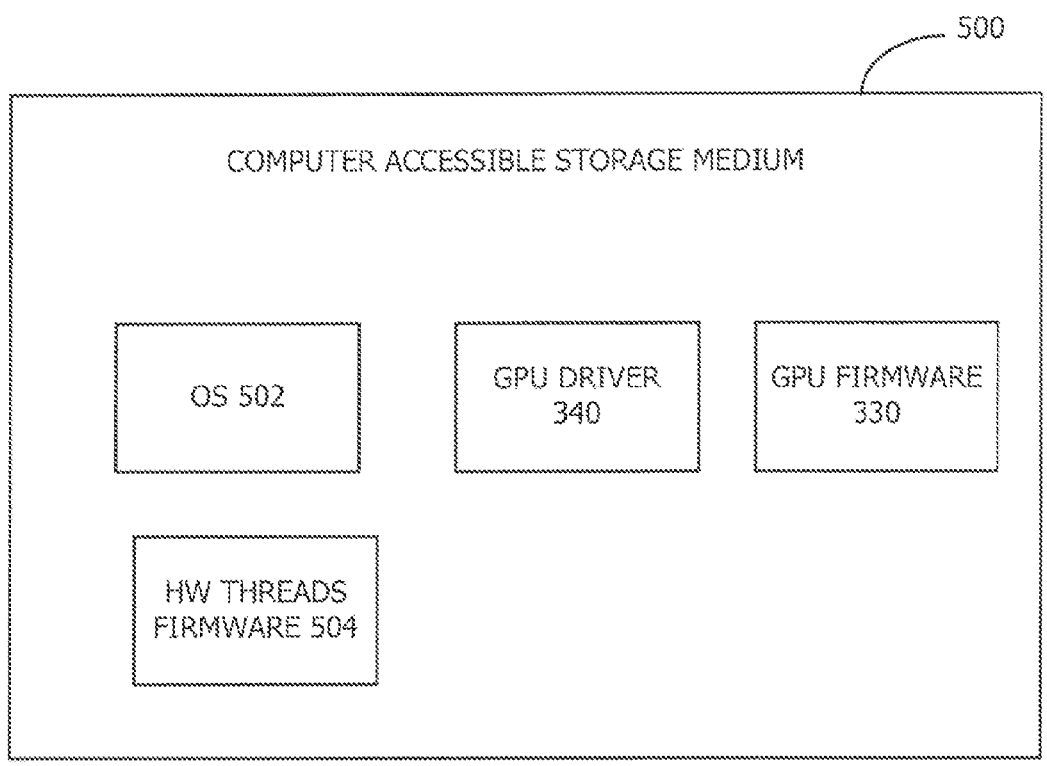
FIG. 5 is a block diagram of a computer accessible storage medium in accordance with one embodiment.

Referring to FIG. 5, a block diagram of a computer accessible storage medium 500 is shown. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM 5 (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include micro-electromechanical systems (MEMS), as well as storage media accessible via a communication medium such as a network and/or a wireless link.

The computer accessible storage medium 500 in FIG. 5 may store an operating system (OS) 502, the GPU driver 340, the firmware for the two hardware threads 504 and the GPU firmware 330. Each of the operating system 502, the GPU driver 340, firmware for the two hardware threads 504 and the GPU firmware 330 may include instructions which, when executed in the target device 100, may implement the operations described above. In an embodiment, the OS 502 may be executed on the CPU 202, and the GPU driver 340, the hardware thread firmware 504 and the GPU firmware 330 may be executed on the GPU 204 (e.g. on the processor 320).

Figure 6:
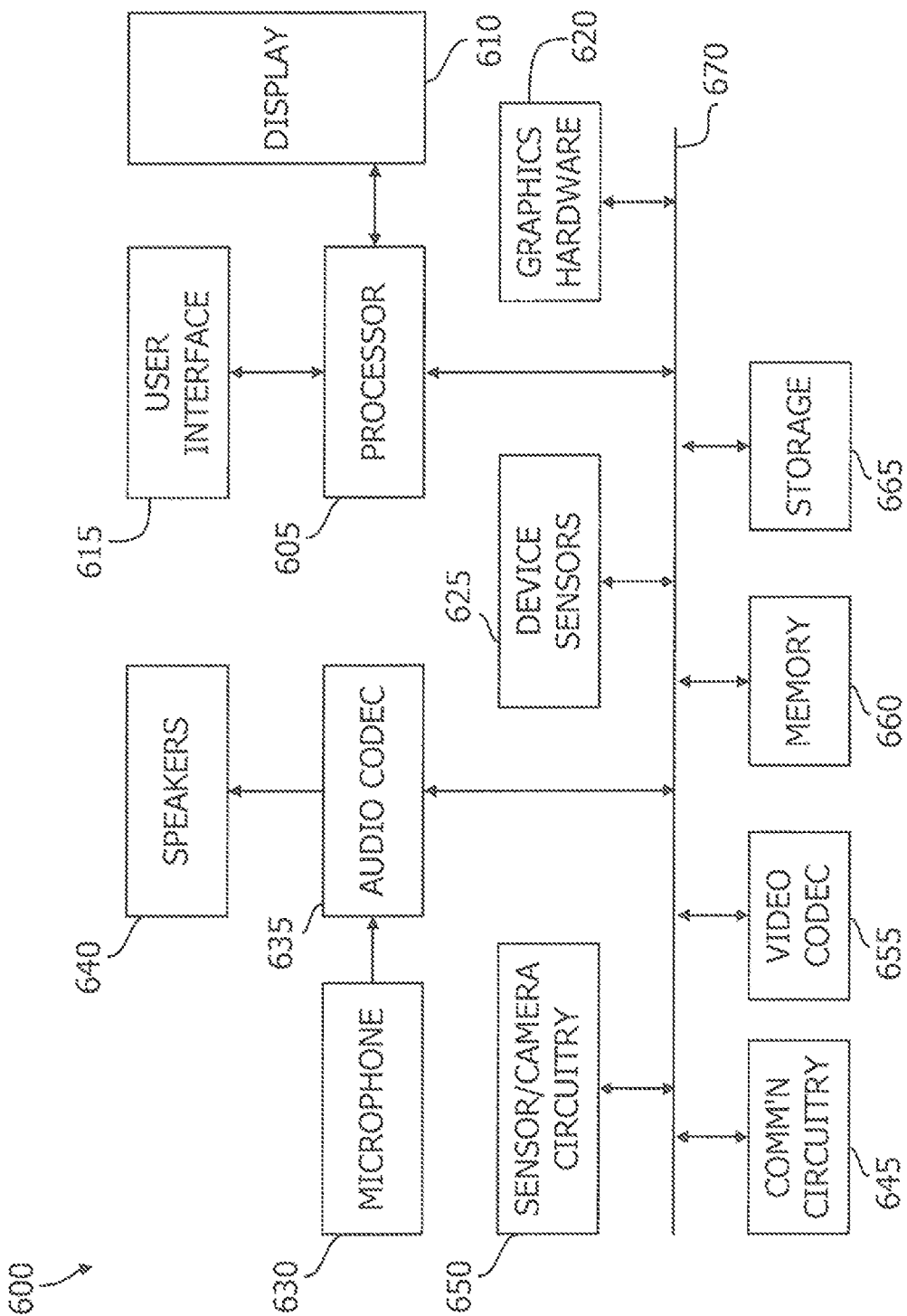
FIG. 6 is a block diagram that illustrates an electronic device in accordance with one embodiment.

Referring to FIG. 6, a simplified functional block diagram of illustrative electronic device 600 is shown according to one embodiment. Electronic device 600 may be used as target device 100 and/or host system 102. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, keyboard, display screen and/or a touch screen. Processor 605 may also, for example, be a system-on-chip such as the IC 112, and those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU). The disclosed control techniques may be implemented to manage the operating frequencies of processor 605 or graphics hardware 620.

Sensor and camera circuitry 650 may capture still and video images that may be processed, at least in part, in accordance with the disclosed techniques by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed, such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processing unit and comprising instructions stored thereon to cause one or more processing units to:
   process commands received for a graphics processing unit (GPU) by a first hardware thread of a multicore microcontroller of the GPU;
   enable a second hardware thread of the multicore microcontroller to obtain performance analysis data of the GPU while the first hardware thread processes the commands; and
   disable the second hardware thread from obtaining the performance analysis data while the first hardware thread continues to processes the commands by having the first hardware thread instruct the second hardware thread to stop obtaining the performance analysis data.

2. The non-transitory program storage device of claim 1, wherein the first and the second hardware threads are duplicates of each other, with each hardware thread having a separate execution unit.

3. The non-transitory program storage device of claim 1, wherein the instructions are stored in a firmware of the processing unit.

4. The non-transitory program storage device of claim 1, wherein the instructions to cause the one or more processing units to disable the second hardware thread from obtaining the performance analysis data comprise instructions by the first hardware thread to clean up one or more resources used by the second hardware thread.

5. The non-transitory program storage device of claim 4, wherein the instructions to cause the one or more processing units to disable the second hardware thread from obtaining the performance analysis data comprise instructions by the first hardware thread to turn the second hardware thread to a dormant state.

6. The non-transitory program storage device of claim 1, wherein obtaining the performance analysis data by the second hardware thread does not impact the processing of commands by the first hardware thread.

7. A method, comprising:
processing commands received for a graphics processing unit (GPU), the commands being processed by a first hardware thread of a multicore microcontroller of the GPU;
receiving a command to start obtaining performance analysis data of the performance of the GPU;
enabling a second hardware thread of the multicore microcontroller to start obtaining the performance analysis data;
receiving a command to stop obtaining the performance analysis data; and
stopping the second hardware thread of the multicore microcontroller from obtaining the performance analysis data by receiving a command from the first hardware thread for the second hardware thread to stop obtaining the performance analysis data,
wherein the first hardware thread of the multicore microcontroller continues processing commands while the second hardware thread is obtaining performance analysis data.

8. The method of claim 7, wherein obtaining the performance analysis data by the second hardware thread does not impact the processing of commands by the first hardware thread.

9. The method of claim 7, wherein processing commands by the first hardware thread comprises scheduling the commands for execution by the GPU.

10. The method of claim 7, further comprising receiving a command to enable the second hardware thread of the multicore microcontroller to obtain performance analysis data, wherein the command comprises of a sampling bit set to a specific state.

11. A device, comprising:
a processing device having integrated firmware; and
a processor embedded in the processing device which is configured to execute program code stored in the firmware to:
process commands received for a graphics processing unit (GPU), the commands being processed by a first hardware thread of a multicore microcontroller of the GPU;
receive a command to start obtaining performance analysis data of the performance of the GPU;
enable a second hardware thread of the multicore microcontroller to start obtaining the performance analysis data;
receive a command to stop obtaining the performance analysis data; and
stop the second hardware thread of the multicore microcontroller from obtaining the performance analysis data by receiving a command from the first hardware thread for the second hardware thread to stop obtaining the performance analysis data,
wherein the first hardware thread of the multicore microcontroller continues processing commands while the second hardware thread is obtaining performance analysis data.

12. The device of claim 11, wherein obtaining the performance analysis data by the second hardware thread does not impact the processing of commands by the first hardware thread.

13. The non-transitory program storage device of claim 1, wherein the commands are associated with a device application, and wherein the instructions to cause the one or more processing units to process commands received for a GPU by a first hardware thread of a multicore microcontroller of the GPU further comprise instructions by the first hardware thread to schedule the commands associated with a device application for execution by the GPU.

14. The method of claim 7, wherein stopping the second hardware thread of the multicore microcontroller from obtaining the performance analysis data further comprises receiving a command from the first hardware thread to clean up one or more resources used by the second hardware thread.

15. The method of claim 7, wherein stopping the second hardware thread of the multicore microcontroller from obtaining the performance analysis data further comprises returning the second hardware thread to a dormant state.

16. The device of claim 11, wherein the program code, when executed, further causes the processor to stop the second hardware thread of the multicore microcontroller from obtaining the performance analysis data by at least receiving a command from the first hardware thread to clean up one or more resources used by the second hardware thread.

17. The device of claim 11, wherein the program code, when executed, further causes the processor to stop the second hardware thread of the multicore microcontroller from obtaining the performance analysis data by at least returning the second hardware thread to a dormant state.

* * * * *